United States Patent [19]

Roderick

[11] 3,955,007

[45] May 4, 1976

[54] HEAT-HOLDING METHOD FOR FOOD AND THE LIKE

[75] Inventor: Ronald R. Roderick, Evergreen, Colo.

[73] Assignee: National Equipment Corporation, Denver, Colo.

[22] Filed: Nov. 25, 1974

[21] Appl. No.: 526,516

Related U.S. Application Data

[62] Division of Ser. No. 370,328, June 15, 1973, Pat. No. 3,868,941.

[52] U.S. Cl. .............................. 426/418; 426/497; 426/520
[51] Int. Cl.² ........................................ A21D 15/04
[58] Field of Search ................ 426/418, 497, 520; 99/467; 126/261, 390, 21 R; 432/1, 9, 23, 31

[56] References Cited
UNITED STATES PATENTS

| | | | |
|---|---|---|---|
| 1,096,200 | 5/1914 | Seale | 126/390 |
| 3,641,992 | 2/1972 | Peyser et al. | 126/21 X |
| 3,667,450 | 6/1972 | Skafte | 126/390 X |

*Primary Examiner*—James R. Hoffman
*Attorney, Agent, or Firm*—Ancel W. Lewis, Jr.

[57] ABSTRACT

A heat-holding method and apparatus for heated food and the like wherein a closed, inner heat-holding compartment with a moisture supply has an outer jacket which conveys heated gases in an upward course of travel without the necessity of a forced air system about the top, bottom and side of the compartment in such a way as to provide substantially uniform heating about the food for extended periods of time and maintain a desirable moisture content for the food.

6 Claims, 6 Drawing Figures

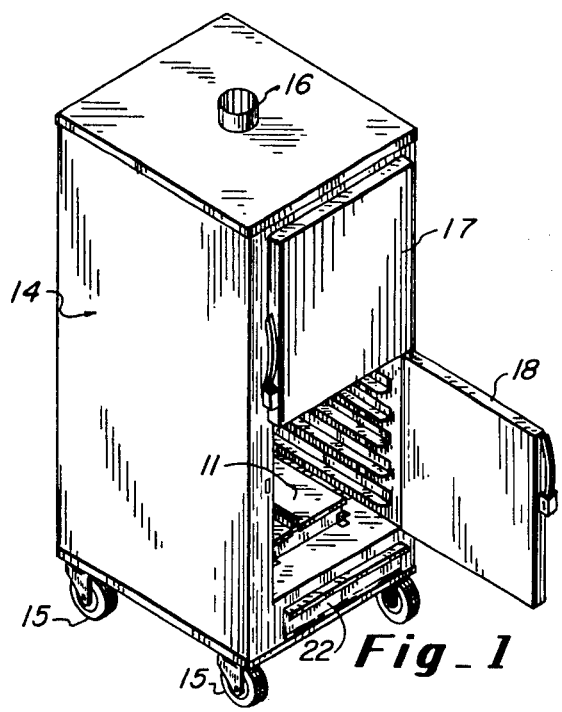
Fig_1
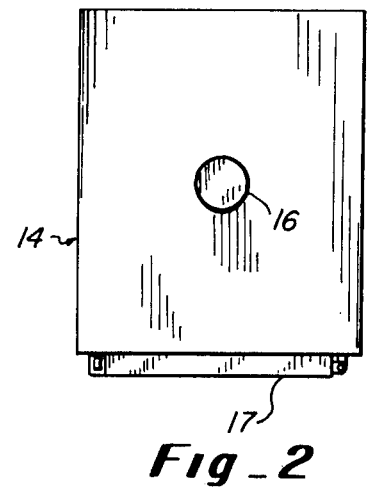
Fig_2
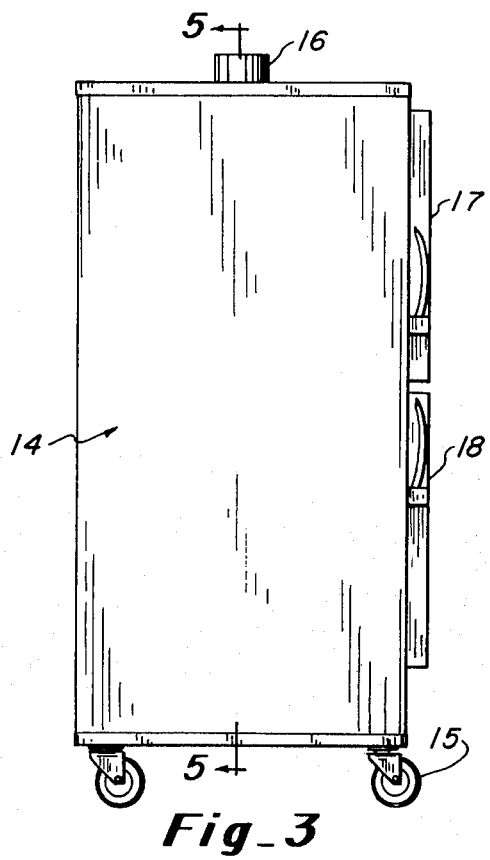
Fig_3
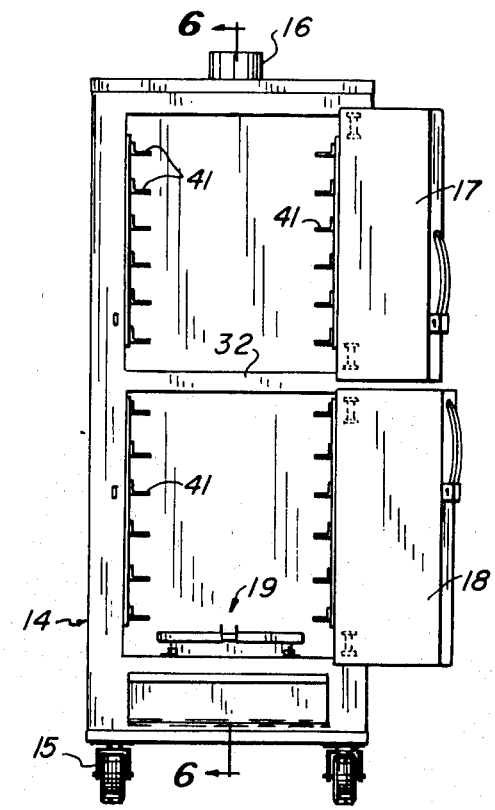
Fig_4

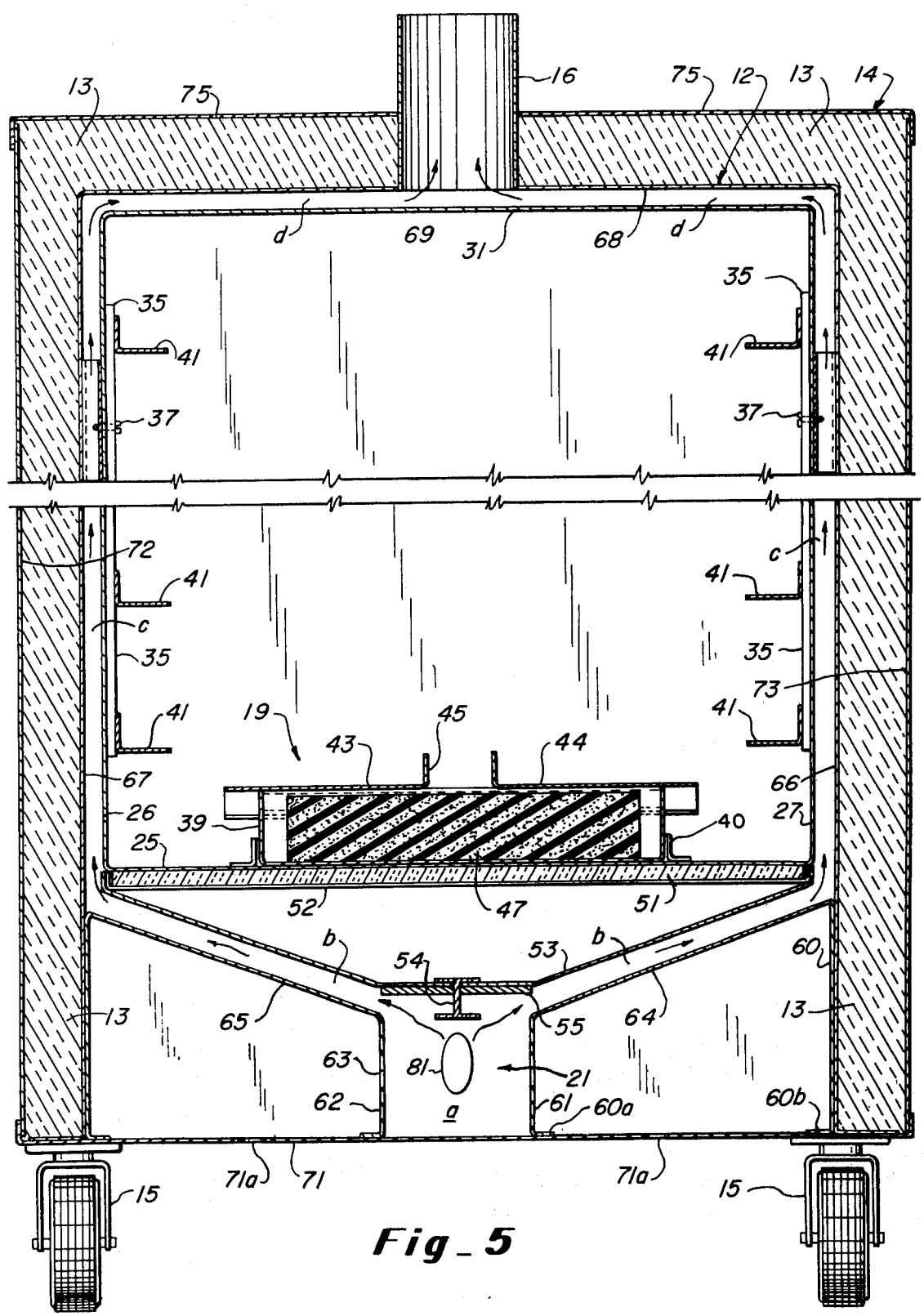
Fig_5

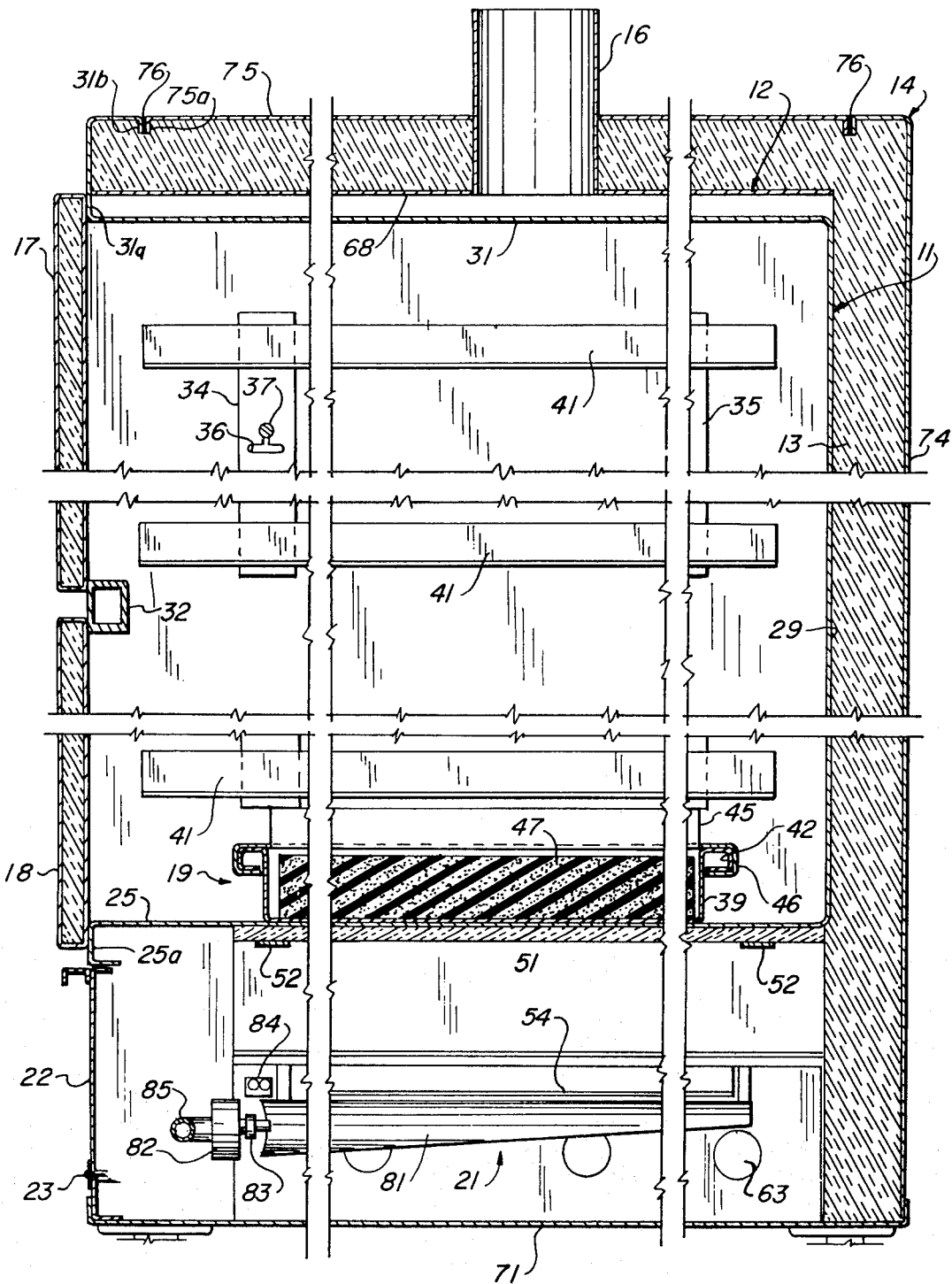
Fig_6

HEAT-HOLDING METHOD FOR FOOD AND THE LIKE

This is a division of application Ser. No. 370,328, filed June 15, 1973 now U.S. Pat. No. 3,868,941.

BACKGROUND OF THE INVENTION

1. Field

This invention in general relates to a novel method and apparatus for holding heated food and the like at substantially uniform temperatures for extended time periods while maintaining a desirable moisture content therein.

2. Description of the Prior Art

In the food industry there is an increasing demand for ovens that will maintain food at substantially uniform temperatures for extended periods of time while maintaining a desirable moisture content therein. Prior known ovens usually employ gas burners for heat and force-circulate the heated gases including fumes, smoke and like products of combustion into direct contact with the food. Moreover, in prior known devices the manner of circulating the heat does not afford uniform temperatures about or around all sides of the food, and are not entirely satisfactory for maintaining the proper moisture content in the food which is particularly important for pizza or the like.

Accordingly, it is a general object of the present invention to provide a novel method and apparatus capable of affording a more uniform heat and moisture control for heated food and the like and capable of being constructed as a readily portable unit.

Another object of the present invention is to provide a novel method and apparatus for holding the temperature and moisture content of heated food without direct contact of the products of combustion with the heated food.

Still a further object of the present invention is to provide a novel heat-holding method and apparatus characterized by the use of a heat-holding compartment closed off from the burner producing the heat to prevent direct contact of the products of combustion with the food and further a jacket about the heat-holding compartment defining flow passages for the heated gases which applies heat to the compartment in such a way as to heat food in the compartment substantially uniform from all sides without the necessity of a force-air blower system or the like.

Yet another object of the present invention is to provide a novel heat-holding method and apparatus including a unique gas flow pattern for heated gases about a heat-holding compartment wherein the bottom of the heat-holding compartment is substantially spaced and heat insulated from the burner flame and the heated gases move gradually upwardly toward the sides to reduce the heat transfer thereinto.

SUMMARY OF THE INVENTION

In accordance with the present invention in a preferred embodiment shown, a portable, heat-holding oven is provided with a closed, heat-holding inner, compartment with tray supports therein and a door to provide selective access thereinto, a burner under the heat-holding compartment for producing heated gases and a jacket about the heat-holding compartment directing the heated gases in a particular flow pattern about the jacket to provide heat gases at substantially uniform temperatures about the food contained therein by heat transfer via all of the walls of the heat-holding compartment. A moisture container in the compartment has adjustable lid sections for selectively regulating the moisture content therein.

DESCRIPTION OF THE DRAWINGS

Other objects advantages and capabilities of the present invention will become more apparent as the description proceeds taken in conjunction with the accompanying drawings in which:

FIG. 1 is a perspective view of a heat-holding oven embodying features of the present invention shown as having a lower door in an open position;

FIG. 2 is a top plan view thereof with the doors closed;

FIG. 3 is a side elevation view thereof;

FIG. 4 is a front elevation view thereof with both of the doors pivoted to an open position;

FIG. 5 is a vertical sectional view taken along lines 5—5 of FIG. 3 looking into the oven from the front thereof; and FIG. 6 is a vertical sectional view taken along lines 6—6 of FIG. 4 looking into the oven from one side.

Referring now to the drawings in FIGS. 1–6, there is shown a portable heat-holding oven which, in general comprises of an inner heat-holding compartment 11, a heating jacket 12 about the heat-holding compartment, a layer of heat insulation 13 around the top, sides and back of the heating jacket and an outer housing 14 around the heat insulation 13 together with casters 15 mounted on the bottom of the outer housing to afford ready movement of the oven. A preferred insulation 13 found suitable is 2 inches of No. 704 fiberglass insulation. A top duct or tube 16 projects upwardly through the top of the outer housing 14. A pair of upper and lower hinged doors 17 and 18, respectively, provide access into the inside of the heat-holding compartment 11. The doors shown have inner layers of heat insulation. A moisture container assembly 19 is mounted in the heat-holding compartment 11 and a heat source in the form of a gas burner assembly 21 is provided below the heat-holding compartment 11. A front cover 22 across the front of the housing and hinged at 23 provides access to the burner assembly 21 from the front of the device.

The inner, heat-holding compartment 11 is substantially closed or sealed thereby preventing the products of combustion produced by the burner assembly 21 from directly contacting the food contained therein. As best seen in FIGS. 5 and 6, the inner, heat-holding compartment 11 comprises a bottom wall 25, upright, opposed side walls 26 and 27, respectively, a rear wall 29, and a top wall 31 arranged so that the compartment is a box-like structure rectangular in both plan and side elevations. The compartment walls are made of a heat-conductive imperforate material such as sheet metal and are radiused at the corners. A preferred material is 18 gauge stainless steel. The front of the compartment 11 is left open except for an intermediate cross brace 32 for added strength. The oven walls are constructed with a relatively short, downturned and inturned extension 25a from bottom wall 25 and a relatively short, upturned, inturned and down turned extension 31a from the top wall. The upper and lower doors 17 and 18 fit flush against the outer surfaces of these extensions and inturned extensions of the outer housing 14 and the cross brace 32 to close off the heat-holding compartment 11.

The heat-holding compartment 11 has a layer of heat insulation 51 along the bottom held by a pair of straps 52 turned upwardly at the ends. A preferred insulation 51 found suitable is one-fourth inch asbestos millboard. Below the bottom plate 51 there is provided a truncated V-shaped deflector 53 with a horizontal or flattened bottom portion and upwardly and outwardly inclined sides forming a closed air space between it and the bottom insulation 51 with the closed air space also serving as heat insulation to limit heat transfer via the bottom wall 25. The upper ends of the deflector 53 fold over the ends of straps 52 and insulation 51. A plate 54 having an I-shaped transverse cross-section is supported in a dependent manner at the center of the deflector 53 directly above the burner assembly 21 and above a baffle shield plate 55 extending under the flattened bottom portion of deflector 53, the plate 54 serving to deflect the flame from burner assembly 21 laterally.

The heating jacket 12 is formed by a pair of similar opposed baffle housings comprised of a lower vertical baffle portions 61 and 62 extending vertically in spaced relation to and on opposite sides of the burner assembly 21 forming a vertical passage designated a and the baffle portions 61 and 62 have spaced air inlet apertures 63, upwardly inclined baffle portions 64 and 65 extending parallel to the inclined portions of the deflector 53 in spaced relation thereto to form an upwardly inclined lower jacket passage b in communication with passage a through which heated gases from the burner pass. Each of the baffle housings are constructed with a downturned section 60 extending along the inside of the associated side wall of the compartment and inturned feet portions 60a and 60b which rest on bottom wall 71 of the outer housing and form a confined air space in the bottom of the housing below the inner compartment so as to heat insulate the jacket floor. The bottom wall 71 has a series of apertures 71a. The jacket further includes vertical wall portions 66 and 67 in spaced relation to side walls 27 and 26 to form side jacket passages c on each side of the compartment and a top jacket wall portion 68 in spaced relation to top wall 31 forming a top jacket passage d. The top wall portion 68 has a central outlet opening 69 with the flue duct 16 connected thereto.

The outer housing 14 comprises a bottom wall 71, upright side walls 72 and 73, a rear wall 74 and a top wall 75. Extensions of portions 31a and 25a together with cover 22 form a front face thereof. The top wall 75 has downturned flange portions 75a that are spot welded to a downturned flange portions 31b which is an extension of wall 31, the weld being as represented at 76.

Within the heating compartment 11 there is provided a support structure for trays in the form of two upright plates 34 and 35 spaced from one another each shown as releasably held in place by use of a keyhold-slot 35 therein and a projection 37 fastened to the wall. Each plate carries a plurality of vertically spaced angle members 41 with opposite members at a common elevation supporting trays for food such as pizza or the like (not shown).

The moisture container assembly 19 includes an open pan 39 resting on the bottom wall 25 of the inner compartment and is held in place by rigidly secured angle members 40. The pan 39 has downturned flange 42 along each at the side edges. A split lid made of two opposed lid sections 43 and 44 afford an adjustable opening for the evaporation of moisture into the heated compartment at a controlled rate. Each lid section has an upturned flange 45 at the inner end and a U-shaped side flanges 46 along each side which embrace the flange 42 of the pan and slide therealong in a guided movement. A sponge 47 is contained in the pan 39 to facilitate a controlled evaporation of the fluid therein usually water. The evaporation is also controlled by the setting of lid sections 43 and 44 therealong at a particular position which regulates the size of the top opening in the pan and thereby the amount of evaporation.

The burner assembly 21 is conventional gas burner structure and as shown is comprised of a burner head 81 with orifices at the top, a mixing valve 82, inlet orifice 83, pilot 84 and inlet pipe 85, the burner being capable of being adjusted to regulate the heat generated in the jacket passages.

Operation

In the operation of the above described apparatus, the burner assembly 21 heats the gases surrounding it and the heated gases rise first through passage "b" in a direction toward the bottom of the heat-holding compartment 11 with the air space and heat insulation 51 limiting the heat transfer via the bottom wall 25. The heated gases then pass through the side jacket passages c heating the side walls 26 and 27 and then across the top jacket passage d and finally out opening 69 and duct 16 thereby heating top wall 31. In this way all of the walls of the heat-holding compartment are at about the same temperatures and heat is conducted about the food from all directions. With this configuration for the compartment 11 and flow passage around the compartment the heated flow of gas of a selected, controlled temperature is moved along at least two pairs of perpendicular axes, that is, two sides, the top and the bottom, and about a major portion of the external surface of the volume of gas to provide substantially uniform heating of the gas while at the same time the imperforate walls forming the compartment 11 maintain the confined volume of gas in a relatively still condition, thereby avoiding air flow directly about the food. It is noted also that the spacing of angle members 41 away from the side walls, permits free heat flow behind the angle members 41. The moisture in the pan and sponge evaporates into the compartment but never reaches the boiling state. The operating temperatures of the inside of the compartment for holding pizza or the like are about 175° to 200°F.

Although the present invention has been described with a certain degree of particularity, it is understood that the present disclosure has been made by way of example and that changes in details of structure and programming may be made without departing from the spirit thereof.

What is claimed is:

1. A method of holding food and the like at substantially uniform temperature for extended periods of time while maintaining a desirable moisture content therein, comprising the steps of:
   a. confining a relatively still volume of gas about a food and the like,
   b. moving a flow of heated gas of a selected temperature about and in heat exchange relation to and relative to said volume of gas to provide substantially uniform heating of said volume of gas while at the same time maintaining said volume of gas in a relatively still condition, and c. introducing a controlled quantity of moisture arranged in open fluid communication with said volume of gas into said volume of gas.

2. A method as set forth in claim 1 wherein said flow of heated gas moves through a course of travel beginning at a point below said confined relatively still volume of gas, then upwardly along opposite sides of said volume of gas, and finally across the top of said volume of gas.

3. A method as set forth in claim 1 wherein said moisture is introduced by evaporating moisture off a water surface having a selected controlled surface area.

4. A method as set forth in claim 1 wherein said water surface is in direct contact with said relatively still volume of gas.

5. A method as set forth in claim 1 wherein said heated gas is maintained at a temperature in the range of about 175° F. to 200° F.

6. A method of holding food and the like at substantially uniform temperature for extended periods of time while maintaining a desirable moisture content therein, comprising the steps of:
a. confining a relatively still volume of gas about a food and the like in a compartment having imperforate heat-conductive walls,
b. maintaining a flow of heated gas of a selected temperature about said volume of gas
   i. along at least two pairs of perpendicular axes and
   ii. about a major portion of the external surface of said volume of gas to provide substantially uniform heating of the gas while at the same time maintaining said volume of gas in a relatively still condition, and
c. simultaneously introducing a controlled quantity of moisture in open fluid communication with said volume of gas into said volume of gas during the heating thereof.

* * * * *

UNITED STATES PATENT AND TRADEMARK OFFICE
CERTIFICATE OF CORRECTION

PATENT NO. : 3,955,007
DATED : May 4, 1976
INVENTOR(S) : Ronald R. Roderick

It is certified that error appears in the above-identified patent and that said Letters Patent are hereby corrected as shown below:

Column 5: Claim 4, line 1, change "1" to --3--

Signed and Sealed this

Eighth Day of August 1978

[SEAL]

Attest:

RUTH C. MASON
Attesting Officer

DONALD W. BANNER
Commissioner of Patents and Trademarks